Aug. 17, 1965

A. ERNST 3,200,640

HARDNESS MEASURING APPARATUS, OPERATED BY
A SINGLE COMPRESSIVE MOTION

Filed Nov. 8, 1961

INVENTOR
ALFREDO ERNST

BY Greene, Pineles & Durr

ATTORNEY

Aug. 17, 1965  A. ERNST  3,200,640
HARDNESS MEASURING APPARATUS, OPERATED BY
A SINGLE COMPRESSIVE MOTION
Filed Nov. 8, 1961  3 Sheets-Sheet 2

*INVENTOR.*
Alfredo Ernst by *[signature]*

ATTORNEYS.

INVENTOR
ALFREDO ERNST

United States Patent Office 3,200,640
Patented Aug. 17, 1965

3,200,640
HARDNESS MEASURING APPARATUS, OPERATED BY A SINGLE COMPRESSIVE MOTION
Alfredo Ernst, Via Magenta 10, Varese, Italy
Filed Nov. 8, 1961, Ser. No. 151,085
Claims priority, application Italy, Nov. 9, 1960, 19,336/60, Patent 638,812; Oct. 11, 1961, 18,272/61
4 Claims. (Cl. 73—81)

This invention relates to a hardness measuring apparatus, which can be used to make accurate measurements with load and pre-load, and to give rise to the succession of various operations required for taking the measurement by simply applying gradual pressure by hand to the outer casing of the apparatus, pressing said casing downwards towards the surface the hardness of which is to be determined.

The hardness measuring apparatus embodied in this invention, which comprises a combination including: a penetrating means; a group of members making it possible to apply a pre-load to the penetrating means so said means can be brought smoothly up to the surface to be measured; a group of members making it possible to apply a load to the penetrating means in such a way as will allow said means to penetrate into the material to a certain depth; and a device for measuring the depth of penetration; is characterized by the fact that the penetrating means, and the system comprising the members which determine the load applied are actuated by a common member, preferably consisting of the outer casing of the apparatus, applying to said member a simple, gradual pressure causing it to approach the surface of the material to be measured until it reaches the end of its stroke; said systems being so combined with one another that upon applying said gradual pressure the following operations take place in succession: the measurement of the movement of the penetrating means toward the surface; application of the pre-load to the penetrating means; application of the load to the penetrating means directly and measurement of the depth of penetration.

The accompanying drawings represent two preferred forms of embodiment of the measuring apparatus covered by this patent.

FIG. 1 is a sectional view of one practical form of the device taken along the axis thereof, the right-hand side of the lower portion below part 29 being rotated 45° with respect to the portion above part 29.

Figure 1:
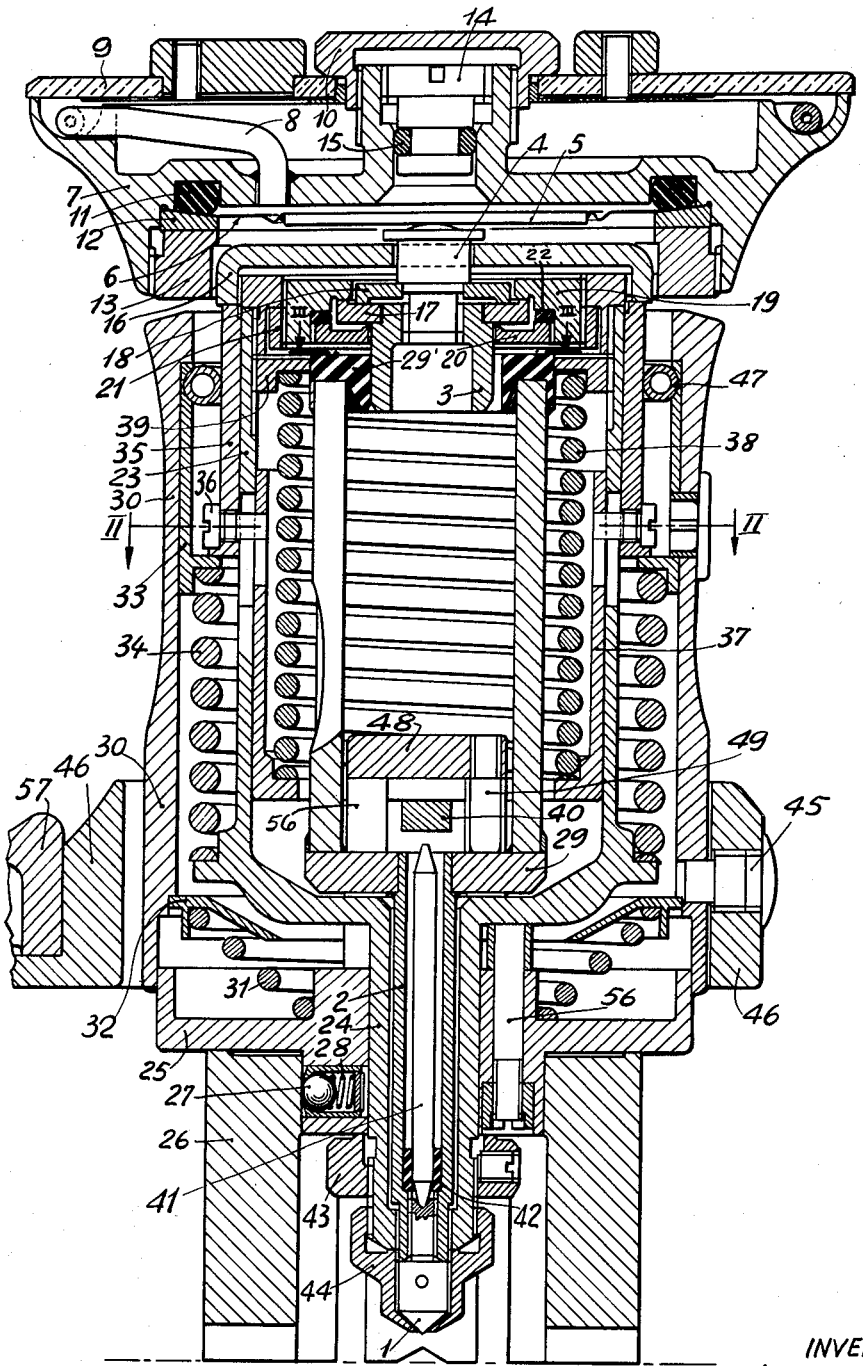
Figure 2:
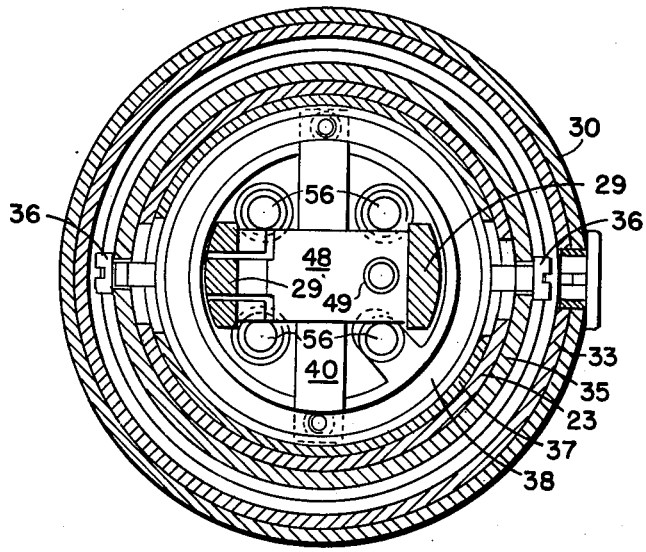
FIG. 2 is a cross sectional view of the device of FIG. 1 taken through plane II—II of FIG. 1.
Figure 3:
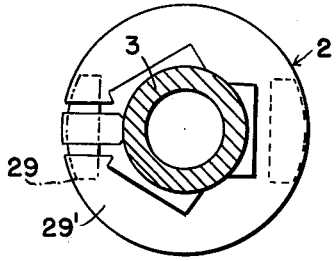
FIG. 3 is a horizontal cross sectional detail view taken on line III—III of FIG. 1.

In reference to FIG. 1, the measuring apparatus comprises penetrating means 1, integral with penetrating tip holder 2, which is elastic in its upper portion 29' and slider 3 free to slide with friction inside said holder 2, said slider 3 being integral with feeler 4 which is in contact with disc 5 soldered or welded to membrane 6. Membrane 6 defines a chamber inside body 7 which is made to communicate with capillary tube 8. A colored liquid is held inside the chamber and in part of the capillary tube in such a way that for a slight shift in the position of the membrane there will be a correspondingly great shift in the liquid inside the capillary tube, which can be readily read from the graduated, transparent scale 9, held in place by knob 10. The whole of the foregoing goes to make up a hydraulic comparator. The seal for the chamber inside body 7 is provided by gasket 11 on which membrane 6 is pressed by means of ring 12, held in turn by threaded lock ring 13.

The threaded plug 14, together with washer 15, close off the chamber and allow the level of the colored liquid in the glass capillary tube 8, open at its end, to be controlled.

Feeler 4 can be raised up from cross piece 16 which has two ends curved downwards, said ends protruding beyond the threaded lock ring 13 through two holes. As shown in FIG. 1, the lock ring 13 extends into the area within crosspiece 16, the interior portion thereof having a T-shaped cross section.

The slider 3 and the feeler 4 are integral with washer 17 and washer 18; the combined feeler 4 and washer 18 have their travel limited in both directions by the threaded lock rings 19 and 20. Threaded lock ring 19 is screwed onto the interior surface of the leg of the T-shaped portion of lock ring 13 and held locked in place by counter lock ring 21, while flexible washer 22 is used to keep threaded lock ring 20 from shifting due to play between the threads.

A cylindrical body 23 is screwed to the outer surface of the leg of the T-shaped portion of lock ring 13, said body 23 ending at its lower portion in a section of reduced diameter 24, sliding in ring 25 with which the base 26 resting on the surface of the material to be tested is engaged; the two parts 25 and 26 are held together by ball 27 pressed by spring 28.

Ring 25 carries four feet 56 which pass through cylindrical body 23; on said four feet 56 is fixed a piece 48 integral with pin 49 which contacts disc 29 making up part of penetration tip holder 2.

Ring 25 serves as a guide at its outer edge for the cylindrical casing 30 which envelopes the apparatus. This casing and ring 25 are kept properly spaced in relation to one another by spiral spring 31 which acts on casing 30 through ring 32. Inside the casing 30 and integral with it is the ring 33 which rests against spring 34, the latter, in turn, acting on cylindrical body 23 on which ring 35 is free to slide. The ring 35 rests against the lower portion of ring 33 and carries two small screws 36 which pass to the inside of cylindrical body 23 and keep the casing 37 against which spring 38 acts, raised up, the upper end of spring 38 resting against threaded lock ring 39, screwed inside cylindrical body 23.

Casing 37 has a cross piece 40 integral with it, said piece 40 being shown in the figure as raised above pin 41, whose lower portion rests on penetrating means 1 and is held inside the cylindrical cavity in penetrating tip holder 2; the rubber sleeve 42 acts to keep pin 41 in its proper position.

Ring 25 has its travel limited by the presence of threaded lock ring 43, screwed onto the section of reduced diameter 24 carrying the guard 44 for the penetrating means 1.

Outer cylindrical casing 30 has at its bottom, a handle means 46 screwed in place by means of two screws 45. This handle is shown in the drawing in transverse section. It has two soft bearings 57 so the palm of the hand can readily be applied to exert pressure.

The ring or sleeve formed by the rubber tubing 47 placed concentric with and inside of ring 33, integral with casing 30, keeps ring 35 centered, flexibly.

The embodiment described above operates in the following manner:

The apparatus as shown in FIG. 1 is ready to be put in operation.

The end of the liquid column in the capillary tube is at its maximum point because the springs 31 and 34 keep the outside casing 30 (which carries the slider 3 and feeler 4) at its uppermost position by means of ring 35 and cross piece 16.

In this position spring 38 is held in compressed position by the two small screws 36 which hold up the lower end of casing 37 and cross piece 40, against the compressive action of said spring 38, thus preventing the load of spring 38 from acting on the penetrating means.

The entire apparatus is raised to its highest position by spring 31 which, resting on ring 25 engaged on base 26 acts upwards against casing 30. Hence pin 49, integral with ring 25 through piece 48, pins 56 and thus, with base 26, acts downwards on disc 29 which makes up part of the penetrating tip holder 2 and is integral with penetrating means 1, so that the penetrating means 1 can protrude a few tenths of a millimeter beyond guard 44, the displacement being limited by lock ring 43 on which ring 25 rests.

Now, pressing the hands against handles 46 and exerting force downwards, that is, against the surface to be measured, spiral spring 31 is deflected and, through spring 34 the whole of the apparatus is made to descend in such a way that reduced diameter section 24 slides inside ring 25. At a certain point the end of penetrating means 1 will come in contact with the surface of the material being tested, coming to a stop, while the action of the downwards pressure exerted by the hands continues. The penetrating means acts against the surface to be measured in a smooth, gentle manner, since the upper part of the penetrating tip holder 2 slides with light, elastic friction on slider 3 and this action continues until the guard 44 for the penetrating means has come to rest against the material to be measured; at this moment the entire portion of the apparatus integral wih cylindrical body 23 will come to a stop. From this moment on, the load which acts against the diamond point of the penetrating means 1 will consist solely of that produced by the friction of the slider, which constitutes the "pre-load." Since the downwards action exerted by the hands continues, spring 34 is compressed, ring 35 and with it the cross piece 16 descend, whereupon feeler 4 maintains membrane 6 in its position due solely to the friction between slider 3 and elastic portion 29', the frictional force being greater than that of the elastic deformation of the membrane.

Casing 30, continuing to be pressed by the hands, continues to descend and, together with it, ring 35, small screws 36, sheath 37 and cross piece 40, the whole under the action of spring 38, until cross piece 40 comes in contact with pin 41. From this moment on, the load on spring 38 acts on the penetrating means and causes it to penetrate into the material to be measured to a greater or lesser depth, depending on its hardness. The depth of the penetration can be noted on graduated scale 9 located on the capillary tube, since the upper portion of the penetrating tip holder 2 carries slider 3 along with it. If this motion should prove excessive, for example, due to an extremely soft material, the downward travel of the slider would be limited by lock ring 20.

The downward action exerted by the hands continues until the step on the inside of casing 30 comes to rest against ring 25, whereupon any further force exerted by the operator will be transmitted to base 26 and through this to the surface of the material, so it will not have any effect on the measuring part of the apparatus.

Logically, spring 34 must be stronger than spring 38 because spring 34 is called upon to normally retain the entire apparatus in the open position as shown in FIG. 1, while spring 38 acts in the opposite direction and expands only when spring 34 has been manually compressed.

The pressure exerted by the hands downwards is continuous from the beginning until the end of the taking of the measurement, without any stops or interruptions, while the various steps and operations required for taking the measurement follow automatically upon one another.

Upon releasing the pressing force, spring 31 brings the apparatus back to the rest position shown in FIG. 1, since pin 49 presses the penetrating tip holder 2 downwards.

Figure 4:
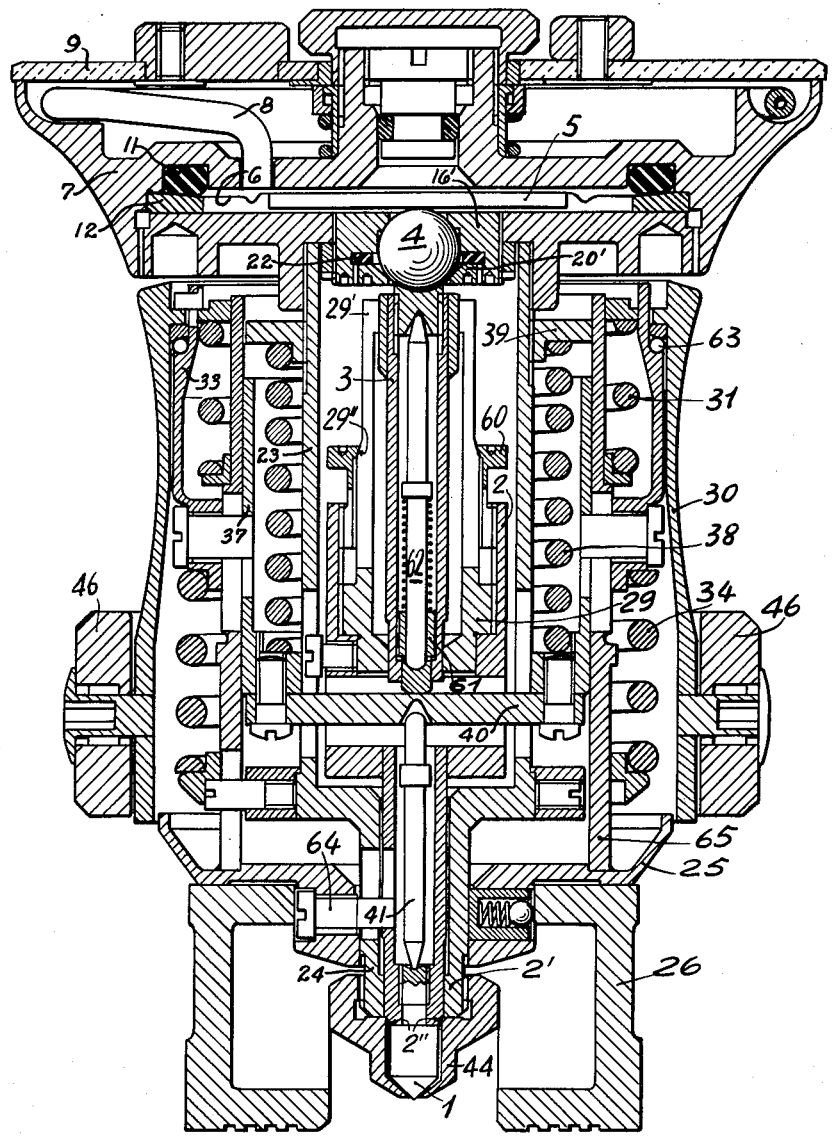
FIG. 4 is a view similar to FIG. 1 of a second, improved form of embodiment of the hardness measuring apparatus.

FIG. 4 is an improved hardness measuring apparatus, which, though based on the same principle of operation as that used for the measuring apparatus in FIG. 1, has its component parts constructed and arranged in a different manner, that is, more simply, easier to disassemble, and making it possible to attain much greater accuracy.

The difference between the embodiment shown in FIG. 1 and that shown in FIG. 4 are the following:

(a) While the embodiment shown in FIG. 1 has washer 18 integral with feeler 4 resting on the underlying washer 17 integral with slider 3, by means of a flat surface, in the embodiment shown in FIG. 4, the contact is made through a ball 4 which presses upwardly against disc 5. Said ball makes it possible to improve the centering and it makes assembly easier. Furthermore, slider 3, with this particular type of construction, is guided over its entire length, which ensures greater precision.

(b) The flexible portion 29' (FIG. 1) which presses against the slider is replaced by flexible clip 29' (FIG. 4) which exerts an adjustable pressure against slider 3 by way of lock ring 60 receiving its support at the outer, tapered portion 29'' of clip 29'. Said clip thereby creates an exactly adjustable frictional resistance, which is used to apply the pre-load to penetrating means 1.

(c) The cross piece 16 (FIG. 1), which is used for zeroing is done away with and the zeroing is performed by means of pieces 61–62 which act upwards. The ball 4 is held between parts 16' and 20'.

(d) Unlike the embodiment shown in FIG. 1, the outer handle means 46 (FIG. 4) and the outer casing 30 are free to turn because they are supported by a ball crown 63 to aid in taking the measurement.

(e) The return downwards of the penetrating means holder 2–2' (FIG. 4) does not take place through piece 48 and pin 49 (FIG. 1), but, instead, through screw 64 which is in direct contact with penetrating means holder 2.

(f) The ring-shaped rubber tube 47 and guide 25 (FIG. 1) are done away with and replaced by cylinder 65 (FIG. 4) integral with ring 25; the entire measuring portion is guided below and above (above by lock ring 39), over a very long portion, ensuring high accuracy.

(g) The spiral spring 31 (FIG. 1) is replaced by a coil spring 31 (FIG. 4) situated in the upper part of the apparatus with the advantage of taking up less space.

(h) The stopping lock ring 43 (FIG. 1) is done away with and replaced by the action of screw 64 (FIG. 4).

(i) In FIG. 4, the stem 2' of the penetrating means holder rests on guard 44 and carries a lower tapered portion 2'' which defines the stop position.

It will be apparent from the above description that the overall dimensions of the apparatus in FIG. 4 had been appreciably reduced, compared to the embodiment in FIG. 1 and, furthermore, that the various parts are readily replaceable, the whole being embodied in such a manner as to provide much greater accuracy.

It is understood that the shape and size of the parts comprising the apparatus embodying this invention may vary, consistent with the description given herein, without therefore departing from the scope of the present invention.

What I claim is:

1. Hardness measuring apparatus comprising load and preload means adapted for accurate measurements on non-smooth irregular surfaces as well as regular surface comprising, an outer cylindrical casing having means for manually pressing the device onto a surface to be tested for hardness in an axial direction with respect to said casing, an annular base member connected to slide axially with respect to the lower part of said outer casing, a projecting annulus on said base member adapted to rest on the surface to be tested, a first compression spring means normally holding said base member and outer casing axially extended with respect to each other but being compressible whereby it holds said annulus on the surface to be tested by predetermined pressure when the device is pushed against a surface to be tested, chamber containing means positioned adjacent the opposite end of said casing with respect to said base member, said chamber containing means comprising a diaphragm forming one wall of a chamber therein, a penetrating tip holder having a penetrating tip at the lower end thereof, shield means for said penetrating tip, cylindrical means connecting said chamber containing means to said shield means, said cylindrical means having a lower portion of reduced diameter adapted to slide within said base member, means including a second compression spring connecting said cylindrical means to said casing for axial movement with respect to each other, feeler means positioned for axial movement with respect to said chamber to act on the diaphragm of said chamber containing means, means on said cylindrical means to limit the axial movement of said feeler means, slider means contacting said feeler means, a first pressure transmitting means slidably connecting the penetrating tip holder to said feeler means whereby pressure applied to said casing is partially transferred to said penetrating tip through said second compression spring to preload said tip, a second pressure transmitting means adapted to move axially with respect to said feeler to apply back pressure thereto in the direction of said diaphragm after said first spring means has been compressed, pin means adapted to apply pressure to said penetrating tip, an inner casing comprising means adapted to contact said pin means after the outer casing has been moved axially to compress said first and second springs, third compression spring means adapted to apply predetermined uniform pressure to said inner casing, said third compression spring means acting on said inner casing to apply uniform pressure to said penetrating tip after said first and second springs have been compressed, and means connecting said second pressure transmitting means to the inner casing to transmit to the feeler the movement of the tip after preloading under the pressure of said third compression spring means.

2. Hardness measuring apparatus as claimed in claim 1, wherein said shield means for the penetrating tip has a tapered outer portion closely conforming to the shape of said tip.

3. Hardness measuring apparatus as claimed in claim 1, wherein said feeler means comprises a spherical portion, said second pressure transmitting means comprising shaft means adapted to press against said spherical means.

4. Hardness measuring apparatus as claimed in claim 1, wherein said means connecting said cylindrical means to said casing comprises an inner ring connected to said casing, and rotatable bearing means connecting the inner ring to said casing whereby said casing may be rotated with respect to the remainder of the apparatus.

References Cited by the Examiner
UNITED STATES PATENTS

| | | | |
|---|---|---|---|
| 2,667,065 | 1/54 | Ernst | 73—81 |
| 2,667,066 | 1/54 | Ernst | 73—81 |

RICHARD C. QUEISSER, *Primary Examiner.*

ROBERT L. EVANS, *Examiner.*